Jan. 28, 1969   R. W. STONE ET AL   3,424,260

HYDRAULICALLY OPERATED GOLF CARTS

Filed May 15, 1967

INVENTORS
ROBERT W. STONE
BENJAMIN G. STONE

BY

*Joseph A. Fenlon, Jr.*

ATTORNEY

United States Patent Office 3,424,260
Patented Jan. 28, 1969

3,424,260
HYDRAULICALLY OPERATED GOLF CARTS
Robert W. Stone and Benjamin G. Stone, St. Louis County, Mo., assignors of ten percent to V. Jack Muehlenkamp, St. Louis, Mo.
Filed May 15, 1967, Ser. No. 638,209
U.S. Cl. 180—66                      7 Claims
Int. Cl. B60k 3/00; F16d 31/00

ABSTRACT OF THE DISCLOSURE

A battery powered vehicle utilizing the battery power to operate a hydraulic pump and thereafter provide the motive forces for the vehicle through a hydraulically operated variable speed drive system, whereby to eliminate the large ampere-hour drains on batteries which occur when starting and stopping the present direct electrical drive systems.

---

Figure 1:
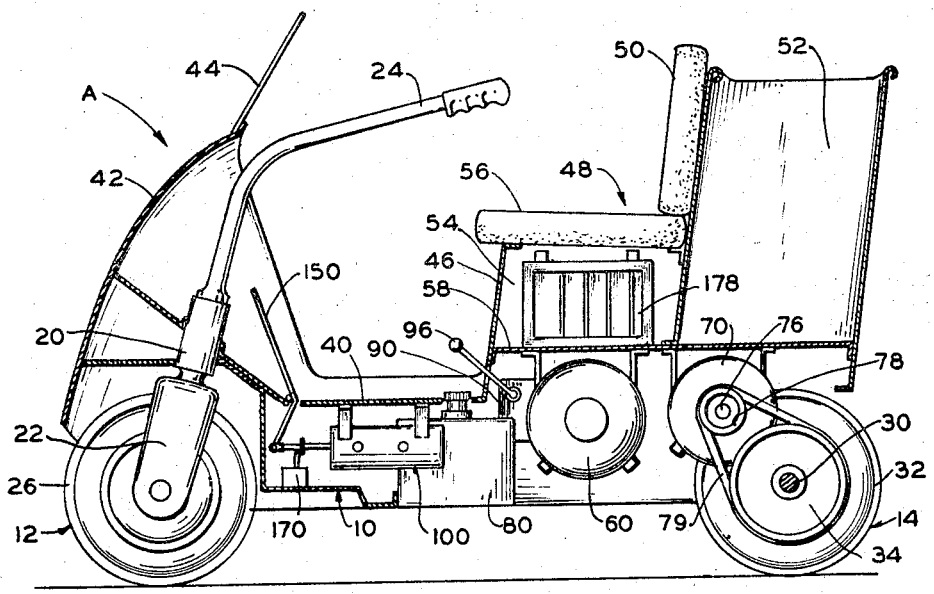

It is the object of this invention to provide a battery operated vehicle with a self-powered drive designated to provide more efficient battery usage and longer operating times between charges.

With the above and other objects in view, which will become immediately apparent upon reading the specification, our invention resides in the unique and novel form, arrangement, construction and interrelationship of the various parts and elements of the device described in the specification, shown in the drawings and claimed in the claims.

Most conventional golf carts of today are purely electrically operated. Battery power is utilized to operate an electric motor which in turn drives the wheels. When the cart is moving the system is relatively efficient. However, when the cart is stopped and the battery power is required to start the cart in motion, large quantities of current are required to start the motor operating and large battery current drains occur until the motor develops substantial rotational speed. This large current flow discharges the battery substantially more quickly than normal motor operation, diminishes the life of the battery, and causes the battery to require recharging after short periods of usage. Present day systems employ speed switches and resistors in series with the motor during starts in attempts to limit current flow; however, these systems are still not satisfactory as the resistors waste power and cart batteries still must be recharged after 36 holes of golf. The system described here affords such an improvement that the length of time between charge intervals is doubled, and the cart batteries are now required to be recharged only after 72 holes of golf.

In the drawings:

FIGURE 1 presents a golf cart embodying our invention with the outer paneling partially cut away to reveal the internal components.

Figure 2:
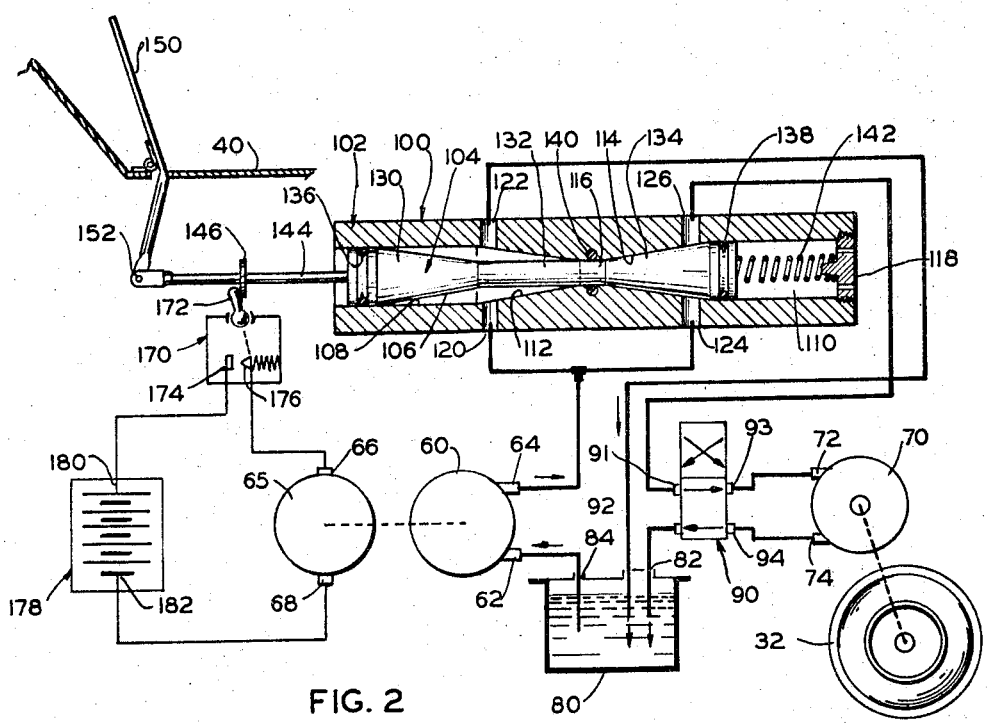

FIGURE 2 is a hydraulic schematic diagram thereof.

Referring now in more detail and by reference character to the drawings which illustrate a preferred embodiment of my invention, A designates a golf cart comprising a chassis 10 supported above the ground G by a front wheel assembly 12 and a rear wheel assembly 14.

The front wheel assembly 12 includes a bushing 20 secured to the chassis 10; a fork element 22; a steering lever 24 secured to the fork element 22 and rotatably mounted in the bushing 20; and a wheel 26 rotatably mounted on the fork element 22. The front wheel assembly is conventional and well known.

The rear wheel assembly 14 includes an axle 30 mounted on the rear of the chassis 10; a driven wheel 32 rotatably mounted on the axle 30 and including an integral belt receiving pulley 34; and a conventional second rear wheel (not shown) rotatably mounted on the axle 30 for free rotation with respect thereto in the conventional manner.

Also conventionally, the chassis 10 includes a flooring 40, a forward cowl 42, a windshield 44, a seat support frame 46, a seat 48, a backrest 50, a rear compartment 52 (for golf bags), and a storage compartment 54 beneath the seat 56, the base of which is defined by horizontal panel 58 which also defines the bottom of the rear compartment 52.

Secured to the panel 58 and projecting downwardly therefrom is an electrically operated hydraulic pump 60 having an inlet port 62, an outlet port 64, and a self-contained pump motor 65 which conventionally drives the pump 60 when DC power is applied across electrical terminals 66, 68. Also secured to the panel 58 is a reversible hydraulic motor 70 which has fluid ports 72, 74, and a driven shaft 76 provided at its outer end with a small pulley 78. And endless drive belt 79 is tautly disposed about the pulleys 78 and 34 for conventionally transferring driving power from the shaft 76 to the rear wheel 32.

Mounted on the chassis 10 beneath the flooring 40 is a hydraulic reservoir 80 having an inlet port 82 and an outlet port 84 and mounted adjacent the reservoir 80 is a conventional directional control valve 90 having ports 91, 92, 93, 94, and a conventional selector control member (not shown) which is controlled by manual movement of a handle 96 between two linearly displaced positions.

With the handle 96 in one position, continuous fluid circuit will be established between ports 91 and 93 and a second continuous fluid circuit will be established between ports 92 and 94. With the handle 96 in the second position, port 91 will be connected by the control member to port 94 and port 92 will simultaneously be connected to port 93, all for purposes presently to appear.

Mounted beneath the flooring 40 is a control valve 100 comprising a housing 102 and a piston 104 slidably mounted therein. The housing 102 is provided with an annular inner chamber 106 comprising enlarged cylindrical portions 108 and 110; complementary conical portions 112 and 114, and a diametrally reduced central connecting portion 116, as best seen in FIGURE 2. A removable plate 118 is at the outer end of the enlarged portion 110, and a pair of ports 120, 122 provide access to the conical portion 112 through th ehousing 102. Similarly, a pair of ports 124, 126, provide access to the conical portion 114 through the housing 102. The piston 104 comprises a first conical element 130, an elongated cylindrical element 132, and a second conical element 134. The first element 130 is sized for snug fitting disposition in the conical portion 112 of the chamber 106 at which time the element 130 will close both ports 120, 122; the second conical element 134 is sized for snug fitting disposition in the conical portion 114 of the chamber 106 at which time the ports 124, 126 will be closed; and the cylindrical element 132 is sized for snug but slidable disposition in the central portion 116 of the chamber 106. The ends of the conical elements 130, 134 are conventionally provided with O-ring installations 136, 138 respectively adapted for co-acting with the cylindrical portions 108, 110, respectively of the chamber 106 to form continuous seals during movement of the piston 104 in the housing 102, and similarly the central portion 116 is provided with an O-ring installation 140 to separate hydraulically the complementary halves of the chamber 106. A spring 142 disposed between the plate 118 and the conical element 134 biases the piston 104 to the position where the ports 124, 126 are closed. Pivotally mounted on the piston 104 and projecting outwardly therefrom is a push rod 144 for purposes presently to appear.

Pivotally mounted on the flooring 40 is a foot pedal 150 having at one end a link element 152 which is connected with the outer end of the push rod 144. Centrally located on the push rod 144 is an annular disc 146. Mounted on the chassis 10 adjacent the disc 146 is a spring-biased, normally closed electrical limit switch 170 having an upwardly extending toggle arm 172. The switch is located in such position that the disc 146 will cause the toggle arm 172 to be actuated which in turn causes electrical contact terminals 174, 176, to open when the foot pedal 150 is in the full up position, and which will cause a circuit to be completed between the contact terminals 174, 176 when the foot pedal 150 is moved downwardly.

Electrical power is furnished by a storage battery 178 stored in the seat storage compartment 54 and having a positive terminal 180 and a negative terminal 182.

The electrical circuit is relatively simple with the battery terminal 180 being connected to the contact terminal 174, the contact terminal 176 being connected to the pump motor terminal 66, and the pump motor terminal 68 being connected to the battery negative terminal 182, as best seen in FIGURE 2.

The hydraulic circuit is also relatively simple with the inlet port 62 of the pump 60 being connected to the reservoir outlet port 84; the outlet port 64 of the pump 60 being connected to the ports 120 and 124 of the valve 100; the port 122 of the valve 100 being connected to the inlet port 82 of the reservoir 80; the port 126 of the valve 100 being connected to the port 91 of the directional control valve 90, the port 92 of the valve 90 being also connected to the inlet port 82 of the reservoir 80; and the ports 93, 94, of the valve 90 being respectively connected to the ports 72, 74, of the drive motor 70.

In operation, no electrical power will be used until the foot pedal 150 is depressed because of the break in the electrical circuit caused by the actuation of the limit switch 170. When the foot pedal is first depressed, the pump 60 will immediately start operating and circulating hydraulic fluid from the reservoir 80, through ports 120 and 122 of the valve 100, and back to the reservoir. Since the pump will be under little or no load conditions, battery drainage will be only slight. Then as the foot pedal 150 is depressed further, the volume of space between the conical element 130 and the conical portion 112 of the housing will progressively decrease until the cross-sectional area of such space will be sufficiently small to cause the fluid to start flowing through the motor 70 by way of ports 124, 126. At this time, depending upon the setting of the handle 96 of the directional control valve 90, the drive motor 70 will start to operate slowly in either forward or reverse. The speed of motor 70 operation will thereafter be a function of the displacement of the foot pedal 150 and may be regulated by the operators moving his foot on the pedal 150, full speed being obtained at the full down position.

It should be here noted that our invention conserves power in two ways as compared with a pure electrical system. First, because of the natural time delays built into the valve 100, it is virtually impossible for battery power to be applied directly to moving a stopped load which would require substantial moving power and large quantities of starting current. Second, the need for current limiting resistors (for starting) and speed regulating rheostats has been completely eliminated.

It should be understood that changes in the form, construction, arrangement and combinations of the various parts and components may be made and substituted for those herein shown without departing from the nature and principle of our invention.

Having thus described our invention, what we claim and desire to secure by Letters Patent is described heretofore and stated in the claims.

We claim:
1. A self propelling drive system operatively mounted on a verhicle comprising a chassis and a plurality of wheels rotatably mounted on the chassis, said drive system including a foot pedal pivotally attached to the chassis, a battery, an electrically operated hydraulic pump operatively connected to a fluid reservoir and adapted for supplying hydraulic fluid under pressure from the reservoir when connected across the battery, hydraulic motor means for driving a rotatable shaft upon receipt of fluid under pressure, belt drive means operatively coupling the shaft and at least one of the wheels for transferring motive power from the driven shaft to the vehicle, means for returning fluid from the motor means to the reservoir, and control means operatively connected to the foot pedal for applying electrical power from the battery to the pump upon downward movement of the foot pedal and for thereafter directing fluid under pressure from the pump to the motor means after the pump has started operating, said control means also including control valve means for increasing and decreasing the amount of fluid supplied by the pump to the motor means as the foot pedal is moved downward and upward respectively whereby to increase and decrease the speed of the vehicle proportionately to the position of the foot pedal.

2. The device of claim 1 wherein the motor means is reversible for driving the shaft in opposite directions and the drive system includes a manually operable selector valve means for selectively altering the path of the fluid through the motor means.

3. The device of claim 1 wherein the control valve means includes a housing having a pair of spaced, coaxial annular chambers, and an annular piston slidably mounted in the housing for linear movement along the common axis, the first chamber is provided with a first pair of ports, the second chamber is provided with a second pair of ports, and the piston and chambers are complementary in shape whereby the first pair of ports will be closed when the second pair of ports are fully open and the second pair of ports will be fully closed when the first pair of ports are fully open.

4. The device of claim 3 wherein the amount of fluid which flows through the second pair of ports is proportionate to the linear displacement of the piston.

5. The device of claim 3 wherein the piston is spring biased in the housing to place the second pair of ports in the closed position when the foot pedal is fully up, and the amount of fluid which flows through the second pair of ports is proportionate to the linear displacement of the piston.

6. The device of claim 5 wherein the control means also includes linkage means operatively connected to the foot pedal and the piston and push means for causing the piston to move against the bias of the spring after the foot pedal has been moved downward a predetermined distance.

7. The device of claim 6 wherein the control means also includes electrical switching means for connecting the pump electrically to the battery immediately upon downward movement of the foot pedal.

References Cited

UNITED STATES PATENTS

| | | | |
|---|---|---|---|
| 1,172,833 | 2/1916 | Ricker | 137—625.5 |
| 2,820,524 | 1/1958 | Bear | 180—66 XR |
| 3,202,234 | 8/1965 | Osborne | 180—65 |
| 3,250,340 | 5/1966 | Roberson | 180—66 XR |
| 3,367,440 | 2/1968 | Becker | 180—65 |

BENJAMIN HERSH, *Primary Examiner.*

MILTON L. SMITH, *Assistant Examiner.*

U.S. Cl. X.R.

60—53; 137—625.5; 180—65